Nov. 25, 1969  H. R. HELLSTROM  3,479,825
IRRIGATIONAL SYSTEMS

Filed July 31, 1967  3 Sheets-Sheet 1

INVENTOR
H. Richard Hellstrom
HIS ATTORNEYS

United States Patent Office 3,479,825
Patented Nov. 25, 1969

3,479,825
IRRIGATIONAL SYSTEMS
Harold Richard Hellstrom, 5245 Center Ave.,
Pittsburgh, Pa. 15232
Filed July 31, 1967, Ser. No. 657,150
Int. Cl. E02b 13/00; B63b 35/04; E02f 5/00
U.S. Cl. 61—13                                    12 Claims

ABSTRACT OF THE DISCLOSURE

A subsurface irrigational system is disclosed wherein a barrier is placed a predetermined distance below the surface of the soil to control the downward percolation of water through the subsoil. Thus, an artificial water table is maintained above the barrier but below the root systems of the particular crop or crops to be planted in the irrigated area. Depending upon the character of the soil and subsoil the artificial barrier can be continuous or discontinuous, impervious or semi-pervious in order to control the height of the artificial water table in accord with the slope of the land, character of the soil, type of crops, soil salinity, and availability of irrigational water. After installation of the barrier, irrigational water is introduced through either a subsurface conduit system or through widely spaced relatively deep subirrigational ditches so that the water flows laterally through the soil and subsoil between the land surface and the artificial barrier. This arrangement provides a minimum of interference with farming equipment and more importantly minimizes surface evaporation of the irrigational water.

---

The present invention relates to irrigational systems and more particularly to methods and means for subsurface irrigation to control both evaporation and downward percolation of the irrigational water and thereby to minimize the quantity of required irrigational water.

Various irrigational methods have been employed since ancient times. In the earliest method, irrigational water was applied by flooding extensive areas of rather smooth, flat land, without any field ditches or levees to guide or control its flow. Uncontrolled or "wild" flooding can be used only where irrigational water is abundant and inexpensive, as surface evaporation and downward percolation of the water can consume enormous quantities of irrigational water.

Other irrigational systems invlove the use of low levees or borders, designated as the border-strip method; check-flooding where relatively large streams are run into level plots surrounded by levees; and the furrow method wherein the furrows made for row crops are utilized to conduct the irrigational water. In all of these variants of surface irrigation, water consumption is unduly great and wasteful because of evaporation and subsoil percolation. The required large streams of irrigational water cause erosion and displacement of the top soil from the higher portions of the fields to the lower. The soil of the field is caked or hardened by the displacement and puddling of heavy soils and by rapid evaporation.

In certain localities subsurface irrigation or subirrigation has been attempted. In this method irrigational water is introduced a substantial distance below the surface of the field to minimize surface evaporation. Particular soil and topographical conditions are required to promote the lateral dispersion of the irrigational water in a rate in excess of the downward percolation thereof. Thus, an impervious subsoil at a prescribed depth and uniform topographic conditions together with moderate slopes are necessary for this type of irrigation. A combination of these conditions, however, is rare and subirrigation has found little application.

In a very few cases artificial subirrigation has been attempted with a conduit distribution system imbedded in the soil well beneath the surface. The loss of water through downward percolation together with the cost of the conduit system has resulted in prohibitive expense.

Various forms of water barriers for creating an artificial water table in the soil and for limiting the downward percolation of water have been proposed heretofore. For example, in Timberlake Patent No. 2,158,952, a treated fabric for returning water is lodged beneath the top soil. A protective layer of clay is placed upon the cloth layer to identify its location for the purpose of avoiding penetration by farm equipment. There are no means disclosed for subirrigation, and the Timberlake arrangement, if efficacious at all, could not be employed in extremely dry climates or where little rainfall is encountered during the growing season.

A similar arrangement is disclosed in Bolt Patent No. 3,276,208 wherein a subterranean asphaltic water barrier is suggested with no means for subirrigation.

Artificial subirrigation systems are suggested by Watkins Patent No. 2,105,800, Hendry Patent No. 2,909,002 and Niederwemmer Patent No. 3,309,875. Watkins discloses a subirrigational device including a barrier and subirrigational conduit suitable for a single plant or for a small area only. Hendry utilizes a complicated closed irrigational and fertilizer system involving individual troughs or gutters for the rows of crops, a supply conduit in each gutter and a drainage system coupling each of the gutters to a mix and recovery tank. The Niederwemmer system is similar but employs closely spaced elongated channeled foils with a supply conduit laid upon the bottom of each channel.

None of the aforementioned systems is suitable for use in large areas of indeterminate size and shape. With the exception of the Niederwemmer system there are no means disclosed for suitable drainage. Watkins and Hendry in effect disclose shallow containers which could not be drained at all except by overflow spillage. As a result there are no means for controlling the salinity of the soil in such containers. Although Niederwemmer shows a drainage system, it is closed circuit which eliminates its applicability to the particular form of agriculture shown.

Insofar as I am aware there are no known subirrigational systems which are capable of maintaining an artificial but continuous water table over a wide area to be irrigated without depending upon rain water or other natural water. Similarly, no subirrigational system is known which is capable of accurately controlling the level of an artificial water table below the root zone to prevent waterlogging of crops' root systems.

I overcome these disadvantages by providing an artificial subirrigational system including an artificial water barrier and means for introducing subirrigational water below the surface of the land and desirably below the root zone, but above the barrier, so as to maintain an artificial water table over an extensive area. Where excessive soil salinity may become a problem, I provide a semi-pervious water barrier with various forms of discontinuities or flow means to allow a limited downward percolation of the irrigational water for suitable drainage. As exemplary forms of such flow means, I contemplate a perforated or other semi-pervious barrier for such controlled percolation.

I employ a subsurface conduit system spaced above the water barrier a sufficient distance to permit lateral flow of the irrigational water, but spaced sufficiently below the land surface to avoid interference with agricultural equipment and waterlogging of root systems. I also contemplate instead of such conduit systems or in conjunction therewith the use of widely spaced relatively deep irrigational ditches the bottoms of which are disposed above the water barrier but desirably below the root zone to introduce subirrigational water at or near the top of the intended artificial water table. In the latter arrangement, the spaces or strips between the subirrigational ditches are sufficiently wide to minimize interference with farming equipment.

The difficulties and expense attendant upon the installation of a subirrigational system are considerably reduced pursuant to the teachings of my invention. In furtherance of these purposes I provide installational methods whereby either the subirrigational conduit system or the subirrigational ditch system can be installed when the water barrier is formed.

I accomplish these desirable results by providing a subirrigational system for agricultural crops and the like, said system comprising a water barrier disposed at a substantially uniform depth below the surface of a field in which the crops are grown, said water barrier being capable of establishing an artificial water table in the soil above the barrier but beneath the root zone of said crops, and means for introducing subirrigational water at a location between said root zone and said artificial water table.

I also desirably provide a subirrigational system for agricultural crops and the like, said system comprising a semi-pervious water barrier installed in a field for said crops, said barrier being substantially co-extensive with said field and being disposed at a substantially uniform depth below the surface thereof, said water barrier in addition having laterally spaced drainage means for permitting a downward percolation of irrigational water therethrough, a plurality of laterally spaced subirrigational means for introducing subirrigational water at a depth in said field between the root zone of said crops and an artificial water table provided by said water barrier, said subirrigational means spacedly alternating with said drainage means respectively so that subirrigational water is caused to flow laterally outwardly and then downwardly from said subirrigational means to adjacent ones of said drainage means.

My invention also resides in a method for installing a subirrigational system, the steps comprising excavating a strip of an agricultural field, covering the bottom of said excavation with a water barrier strip, excavating an adjacent field strip and uniformly depositing a portion of the removed dirt from said adjacent strip upon said barrier strip to about the height of an anticipated artificial water table to be maintained by said barrier but below the anticipated root zone, laying a subirrigational conduit along the length of said first-mentioned field strip and upon said uniform dirt portion, uniformly depositing the remainder of said removed dirt into said first-mentioned field strip, and repeating the steps of excavating, barrier covering, depositing, conduit laying, and depositing until the entire field is provided with a substantially continuous subsurface water barrier and a subirrigational conduit system spaced above said barrier but beneath said root zone.

My invention also resides in a method for installing a subirrigational system, the steps comprising excavating a strip of an agricultural field, covering the bottom of said excavation with a water barrier strip, excavating an adjacent field strip and uniformly depositing the removed dirt from said adjacent field strip upon said barrier strip with the exception of an open subirrigational ditch extending the length of one lateral side of said first-mentioned field strip, filling in the bottom of said ditch to a uniform height about equal to the height of an anticipated artificial water table to be maintained by said barrier but below the anticipated root zone, and repeating the steps of excavating, barrier covering, depositing and ditching until the entire field is provided with a substantially continuous subsurface water barrier and a subirrigational ditch system spaced above said barrier but beneath said root zone.

During the foregoing discussion, various objects, features and advantages of the invention have been set forth. These and other objects, features and advantages of the invention together with constructional details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
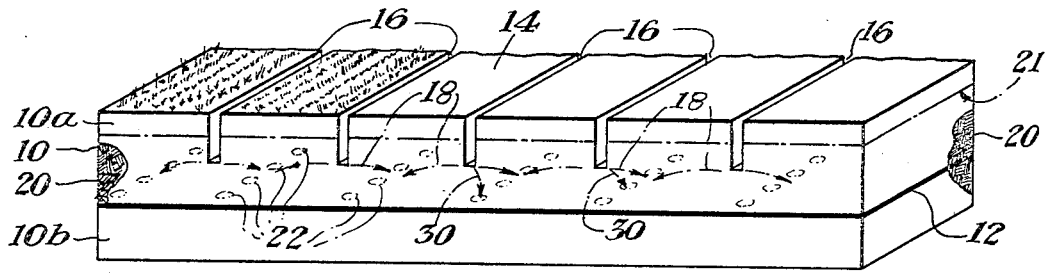
FIGURE 1 is a partial, isometric view of an agricultural field or the like illustrating one arrangement of my novel subirrigational system.

Referring now to FIGURE 1 of the drawings in greater detail, the illustrative form of my subirrigational system shown therein is arranged for use in relatively arid areas and in the type of soil 10 wherein the water percolates quickly and deeply. In this example, an impervious water barrier 12 is installed at a predetermined, desirably uniform, distance beneath surface 14 of the soil 10. Depending upon the character of the soil 10, the amount of water available, and the depth of the root systems of the crops to be grown, the impervious area 12 can vary from as little depth as one foot up to several feet in depth beneath the surface 14. With the aforementioned soil conditions, the impervious barrier 12 desirably is extended uninterruptedly over the entire area of the field to be irrigated.

The depth of the imprevious barrier 12 will also depend upon the amount and extent of rainfall in certain areas. Some arid areas have short-lived torrential rains. The amount of rain water that can be absorbed before the top soil becomes dangerously erroded relates to the depth of the soil above the impervious barrier 12. Further, in certain underdeveloped areas, technological limitations will limit the depth to which the impervious area 12 can be installed.

The impervious barrier 12 can be formed from a continuous layer of asphalt, oil, plastic, tar, concrete or bituminous or equivalent materials. In many cases, the coverage provided by certain of these materials can be extended by mixing earth, ordinary cloth, or other lesser expensive filler material with that of the impervious barrier 12. As explained hereinafter, in connection with FIGURES 5 and 6 of the drawings, the impervious barrier 12 can be laid at the appropriate depth in the soil 10 in the form of an elongated strip of appropriate width. When plastic sheets, for example, are thus installed, the adjacent lateral edges thereof can be sealed to prevent downard percolation of water between the adjacent plastic strips. Alternatively, as described below in connection with FIGURES 2 and 3 the adjacent edges of the plastic strips can be left unsealed or in some cases the strips can be spaced from one another to provide drainage flow means in the form of flow gaps of predetermined width for a controlled downward percolation of the water where drainage is desirable or permissible to prevent oversalinity of the soil. Desirably, the widths of the gaps in dependence upon subsoil conditions and percolation rates are such as to provide drainage flows equal to or less than the lateral, subirrigational flows from the ditches 16.

Also as shown in FIGURE 1 irrigational water is introduced into that portion of the soil 10 above the impervious barrier 12 through a system of subirrigational ditches 16. Depending again upon the character of the soil 10 and the crops to be raised thereon and upon the availability of nuatural and irrigational water the ditches 16 can vary from about 6 inches in depth to several feet in depth. Desirably, the bottom of the ditches 16 are extended into the soil 10 to within about 6 inches to one foot of the water barrier 12.

When irrigational water is introduced into the ditches 16 from a suitable canal or duct (not shown) connecting the ends of the ditches 16, the water spreads outwardly and downwardly as denoted by flow arrows 18 to form an artificial water table 20 in the soil 10 above the impervious layer 12 and substantially co-extending therewith. Desirably the water table 20 is maintained below the anticipated lower limit 21 of the root zone of the crops to be grown in the soil 10, to prevent waterlogging of the roots. The root zone of the crops are then irrigated from the artificial water table 20 spaced therebelow by capillary action of the water through the soil 10a above the artificial water table 18 and surrounding the crop roots. For this reason the bottoms of the subirrigational ditches 16 desirably lie below the root zones of the crop and, to reduce evaporation, above the artificial water table 20.

As shown alternatively in FIGURE 1 the water barrier 12 can be made semi-impervious or otherwise provided with drainage flow means, for example, rows of flow apertures as denoted by chain outlines 22 thereof. The rows of apertures 22 desirably alternate spacedly with the subirrigational ditches 16, and, depending upon the irrigational water available in a given area, the total flow area of the drainage apertures 22 is desirably equal to or less than the lateral dispersion of irrigational water from the ditches 16, so that the artificial water table 20 is maintained at the required or anticipated height. The areas of the flow apertures 22 also will depend upon the character of the subsoil 10b below the water barrier 12. For example, if the soil 10b is extremely pervious and thus is characterized by a rapid downward percolation rate of water, the apertures 22 if used may be small both in number and in total flow area to minimize the loss of subirrigational water while permitting limited and desirable drainage. On the other hand where the subsoil 10b is relatively impervious, and characterized by a slow percolation rate, the apertures 22 can be correspondingly large, both in number and in total flow area to afford the desired drainage. If necessary, two or more rows of apertures (not shown) can be provided between each adjacent pair of the ditches 16.

Figure 2:
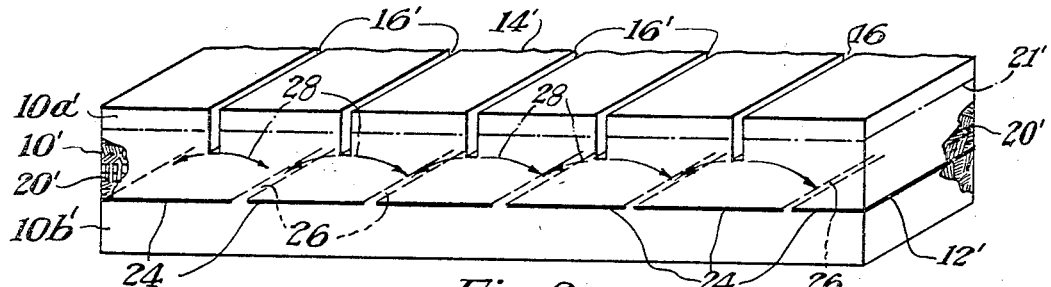
FIGURE 2 is a similar view showing a modification of my novel system.

FIGURE 2 illustrates another arrangement of my invention directed to promoting drainage or limited downward percolation of the irrigational water. In this example, a semi-pervious barrier 12' is employed in conjunction with the subirrigational ditches 16' to establish an artificial water table 20' above the water barrier 12' but below the root zone 21' as set forth above in connection with FIGURE 1. In this arrangement, however, the water barrier 12' is discontinuous and is formed from a plurality of discrete strips 24 of plastic or asphalt or from one or more of the other materials mentioned above. The strips 24 in this example are approximately equal to the center-to-center distance of the subirrigational ditches 16'. The strips 24 are spaced laterally to form elongated drainage flows means or openings or drainage gaps 26 therebetween. Preferably, the ditches 16' are located intermediately with respect to the water barrier strips 24 so that the longitudinal gaps 26 therebetween are spacedly alternated and disposed intermediately relative to the subirrigational ditches 16'. The width of the longitudinal gaps 26 are determined in accordance with a given application of the subirrigational system of FIGURE 2 in much the same manner as the areas of the alternative apertures 22 in FIGURE 1. That is to say, the width of the gaps 26 will vary depending upon the extent of drainage which is required or which can be tolerated in view of available supplies of irrigational water. Thus, the gaps 26 will be relatively narrow when the irrigational water is limited or when the subsoil 10'b is very porous or both. On the other hand a relatively impervious subsoil 10'b or a copious supply of irrigational water may dictate wider gaps 26. In any event the maximum width of the gap 26 desirably yields a corresponding flow rate which is equal to or less than the lateral dispersion of irrigational water from the subirrigational ditches 16', in order to maintain the artificial water table 20' above the water barrier, including the spaced strips 24.

The arrangement of FIGURE 2 is also desirable in those cases where the salinity of the soil 10' tends to build up, either from undesirable salts unavoidably dissolved in the irrigational water or from use of chemical fertilizers. The lateral dispersion of water from each of the subirrigational ditches 16' flows outwardly and downwardly as denoted by flow arrows 28, with a limited amount of the irrigational water escaping downwardly through the longitudinal gaps 26. The drainage thus afforded at such times carries off the soluble salts in that portion of the soil 10'a above the artificial water table 20' to prevent undesirable build-up of salinity. Save for the manner of forming the semi-pervious layer 12' the operation of my invention as shown in FIGURE 2 is similar to that shown above with reference to FIGURE 1 and the alternative usage of the rows of drainage apertures 22, to which subirrigational water flows as denoted by alternative flow arrows 30. If desired, the ditches 16' can be periodically filled with water to provide lateral water flows through the top soil 10a or root zone 21. In this example the irrigational ditches 16 or 16' can be spaced between 40 and 100 feet apart or more depending upon the amount of irrigational water available, the slope of the land, and the rate of lateral dispersion through the soil above the water barrier 12 or 12'.

Figure 3:
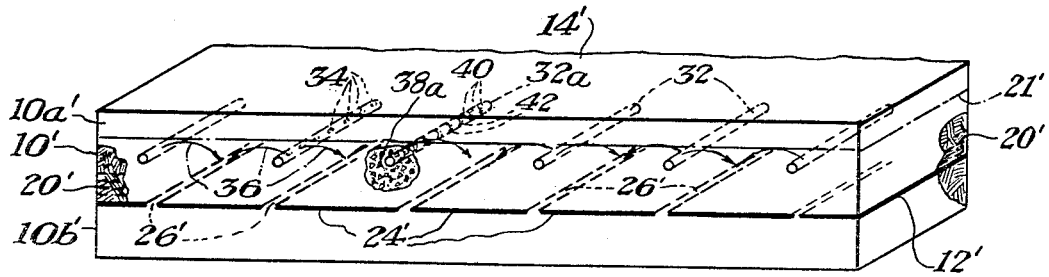
FIGURE 3 is a similar view showing another modification of my system.

Referring now to FIGURE 3 of the drawings, a similar subirrigational system is shown employing the interrupted barrier layer 12' described above with reference to FIGURE 2. In this arrangement however the irrigational ditches 16' are replaced with a subterranean conduit system denoted by conduits 32. The conduits 32 desirably are joined at at least one of their ends to a transversely extending supply conduit (not shown) for conveying subirrigational water to the conduits 32.

In this example, the conduit system 32 is similarly located relative to the bottom of the ditches 16 or 16' which are replaced by the conduit system 32. Thus the conduits 32 can be disposed at a depth of 6 inches to several feet below the surface 14' of the field, that is to say, desirably below the root zone 21' of the crops to be planted therein and above the anticipated artificial water table 20'. The conduits 32 will then lie between about 6 inches and about 1 foot above the water barrier 12' to maintain the artificial water table 20' above the barrier 12'. Each of the conduits 32 is provided with appropriate lateral flow means, for example perforations 34 along the length thereof, to permit lateral flow of sub-irrigational water therefrom. Such water flows laterally and downwardly as denoted by flow arrows 36 in much the same manner as water from the subirrigational ditches 16' as shown in FIGURE 2. Likewise, the flow gaps 26' between the impervious barrier strips 24' permit limited flow for drainage purposes and for maintaining the artificial water table 20'.

Figure 4:
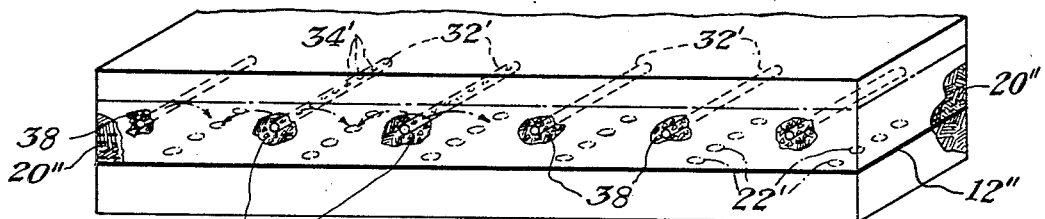
FIGURE 4 is a similar view showing a further modification of my system.

As better shown in FIGURE 4 the conduit system 32 can also be employed with a continuous water barrier 12" which may be either impervious (without drainage means) or semipervious (with flow apertures 22') or other drainage means depending upon agricultural conditions. The conduits 32' (or 32, FIGURE 3) can be laid in gravel 38 to prevent soil from entering their flow apertures 34'.

As used herein the term "impervious barrier" denotes the barrier 12 or 12" (FIGURES 1 and 4) and equivalent, without drainage apertures 22 or 22' or other flow means for subsurface drainage. On the other hand, the term "semipervious barrier" denotes any of the water barriers of the preceding figures, when provided with limited flow, drainage means such as the longitudinal flow gaps 26 between spaced impervious strips 24 or a continuous barrier 12 or 12" (FIGURES 1 and 4) having rows of apertures 22 or 22' or equivalent flow means.

The conduits 32 or 32' can be either rigid or flexible and fabricated as desired from metal, plastic, fiber or ceramic materials. The lateral openings 34 along the length thereof are sized to accommodate the anticipated flow of subirrigational water from the conduits 32 along the length thereof. Depending upon the fall of the conduits 32 or the slope of the land, the apertures 34 can be varied either in size or number or both along the length of the conduits to compensate for changing pressure heads. To facilitate the flow of irrigational water from the conduits 32, each of the conduits can be surrounded or imbedded in gravel 38 (FIGURE 4) or other suitable flow promoting means. In other arrangements the lateral openings 34 can be omitted and the conduit walls made porous to permit lateral flow of water therefrom.

It is also contemplated that each of the conduits 32 can be formed from a longitudinal array of relatively short conduit sections 40 as denoted by the exemplary formation of conduit 32a (FIGURE 3). For example, conventional ceramic field tile can be employed as the conduit sections 40. The field tile sections 40 in that case can be abutted so that their slightly uneven ends resulting from inevitable manufacturing tolerances will provide flow gaps 42 therebetween for lateral dispersion of water. These end gaps 42 coupled with the natural porosity of the field tiles 40 provide adequate lateral flow of subirrigational water from the conduits such as the conduit 32a. Desirably, the field tiles 40 are laid in gravel 38a to prevent soil from entering the gaps 42 and to promote the lateral dispersion of irrigational water.

Figure 5:
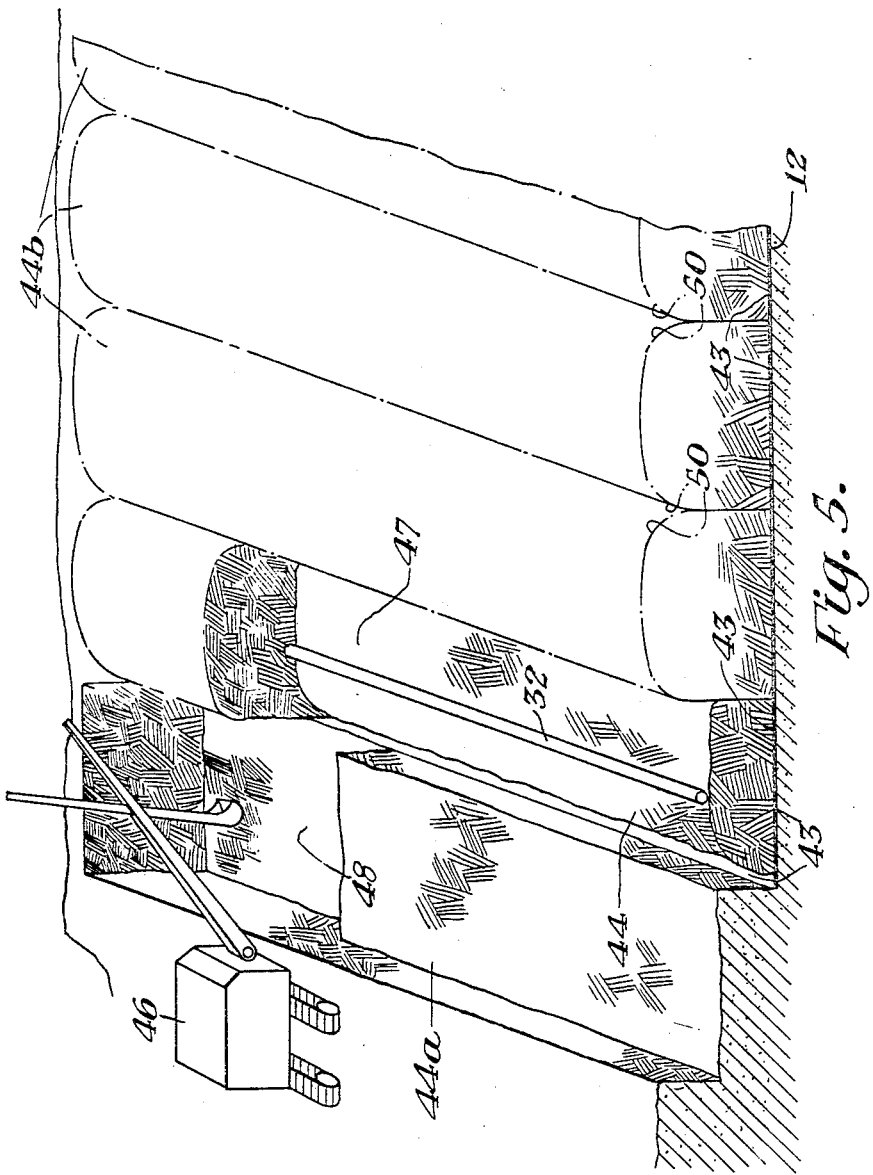
FIGURE 5 is an isometric view of a portion of an agricultural field and the like illustrating a novel method for installing my subirrigational system.

One arrangement for installing the irrigational systems of the preceding figures is shown in FIGURE 5 of the drawings. In this example an elongated section 44 of a given field is excavated to the desired depth of the barrier layer 12 by suitable earth moving equipment 46. Desirably, the barrier 12 is installed in strips such as the strip 43 which completely or substantially covers the bottom of the excavated field section 44. The field section 44 is then partially and uniformly back-filled at 47 from a succeeding field section 44a and a conduit 32 is installed upon the partial back-fill. Desirably the height of the initial or partial back-fill 47 is about that of the artificial water table 20 (FIGURES 1 and 4) above the water barrier 12 formed from the strips 43. With this installational method the conduits 32 disposed generally above the anticipated artificial water table 20 but below the anticipated root zone 21 as described with reference to FIGURES 1–4.

After such installation the remainder 48 of the adjacent field section 44a is then employed to back-fill uniformly the remainder of the field section 44. This produces a completely layered and piped field section, as denoted by the previously completed section 44b. This procedure is continued until the entire field is provided with impervious or semi-impervious barrier 12 or 12' and conduits 32.

When making the installation of FIGURE 5 each of the barrier strips 43 can be overlapped or otherwise joined with adjacent barrier strips 43 of adjacent field sections to prevent losss of water therebetween. Alternatively the strips 43 can be spaced from one another (not shown) to provide the longitudinal flow gaps 26' of FIGURE 3.

The subirrigational arrangement of FIGURES 1 and 2 can be similarly installed with the exception that the conduits 32 of FIGURE 5 are omitted and relatively narrow subirrigational ditches 16 or 16' (FIGURES 1 and 2) are constructed in their stead after the field strips 44 have been back-filled. Alternatively, in the process of back-filling an equivalent ditch can be left along each lateral junction of adjacent field sections 44, as denoted by chain outlines 50 thereof in FIGURE 5. Back-filling is controlled so that the bottoms of the ditches 50 desirably are spaced above the anticipated artificial water table 20 (to reduce evaporation) but below the root zone 21 (FIGURES 1–4).

Figure 6:
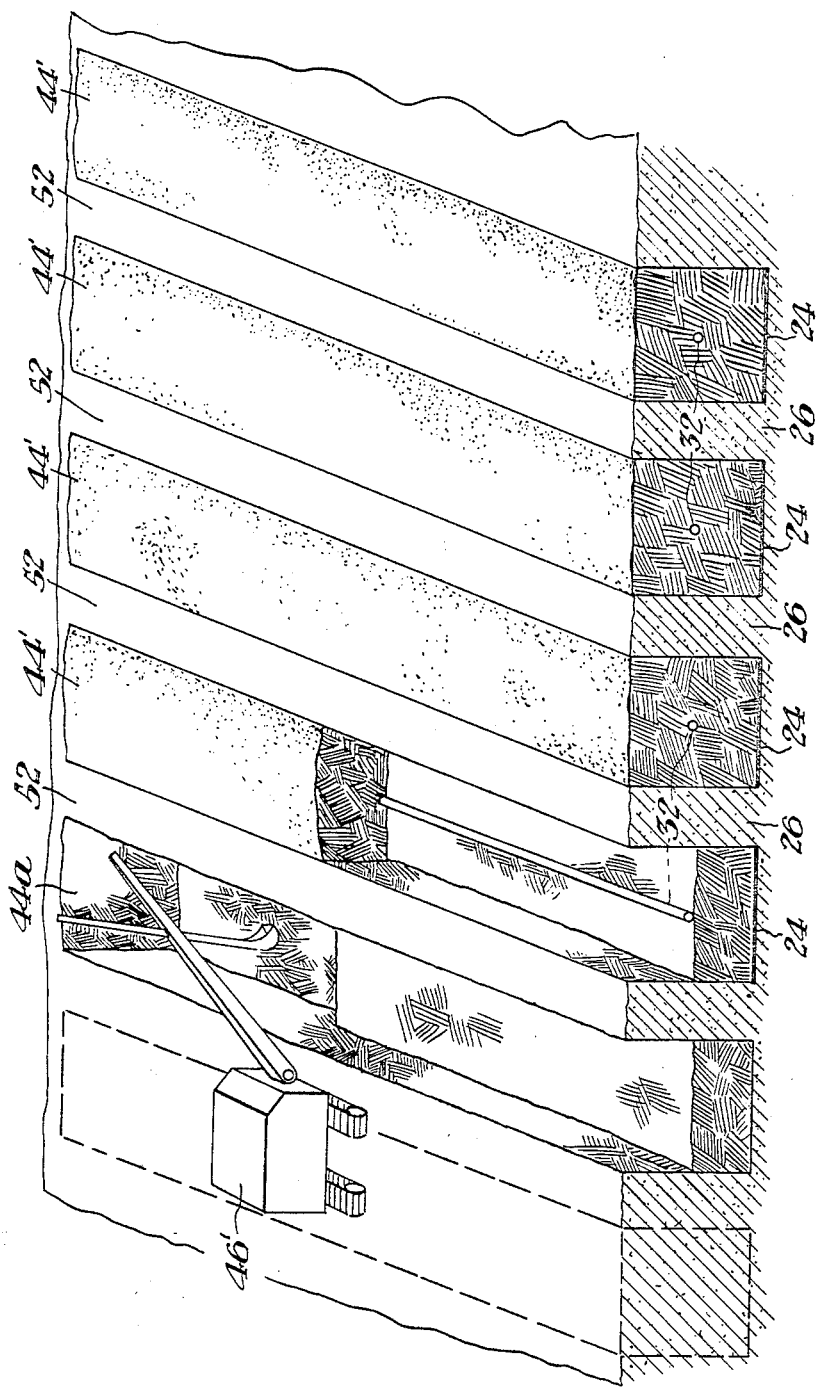
FIGURE 6 is a similar view showing another novel method for installing my subirrigational system.

With reference to FIGURE 6 of the drawings, an alternative installation procedure is illustrated for the subirrigational arrangement of FIGURES 2 and 3 of the drawings where the barrier strips 24 or 24' are relatively widely separated. In the arrangement of FIGURE 6 each field section 44' conforms generally in width to that of barrier strip 24, while gaps 52 between the field sections 44' conform in general to the widths of the flow gaps 26 or 26' between adjacent barrier strips 24 or 24'. Otherwise the installational procedure of FIGURE 6 is similar to FIGURE 5 in that earth from a succeeding field strip 44'a is back-filled into the preceding field section. The conduits 32 can be installed in a manner described in connection with FIGURE 5 or they can be omitted and the subirrigational ditches 16' (FIGURE 2) can be installed in their stead.

It will be seen from the foregoing description that I have disclosed novel subirrigational systems and novel methods for installing the same. My subirrigational systems have the advantage of storing irrigational water in an artificial water table maintained below the root zone of the crops to prevent waterlogging their root systems. The crops are then supplied with water by capillary action of irrigational water from the artificial water table to the root zone. The use of the artificial water table displaced from the root zone minimizes the amount of undesirable soluble salts which are carried into the root zone from the artificial water table.

My novel irrigational system also provides convenient means for the application of liquid fertilizers to the crops and for storing the fertilizer in the artificial water table for controlled, capillary application to the root zone. The disclosed subirrigational system also permits deviation of the soil above the water barrier and artificial water table, which can be enhanced, when the conduits 32 are employed by blowing air therethrough. It has been found that the growth of certain crops can be enhanced by aerating the soil with carbon dioxide or the like which also can be blown through the conduit system 32 when used.

Most importantly my subirrigational system minimizes the consumption of valuable water in arid areas by largely eliminating water run-off and uncontrolled downward percolation of water through the soil. The use of subirrigation in accordance with my invention further provides a uniform application of irrigational water to very large crop areas by introducing the water below the top soil. Erosion of the topsoil is virtually eliminated, and evaporation of the irrigational water is minimized particulary when the subsurface conduit system 32 is employed. When the widely spaced subirrigational ditches 16 or 16' are employed there is a minimum of interference with agricultural machinery. On the other hand the employment of the subirrigational conduit system eliminates any interference with such equipment.

Moreover, by the use of an impervious water barrier 12 or 12″ or a semi-pervious water barrier 12′, my subirrigational system can be adapted to a widely varying range of crops, soil conditions, climatic conditions and differing types of subsoil. Finally, a minimum of labor is required for operation of my subirrigational system.

The use of the subsurface conduits 32 permits the subirrigation of terrains having irregular topography. In addition the use of such conduit systems provides a closer metering of irrigational water to prevent under- or overhydration of the soil. In this connection the supply conduit (not shown) for the conduit system 32 can be provided with a hydrometer-operated flow control means so that irrigational water is pumped automatically to the extent of the desired moisture content of the soil at the depth of the hydrometer. Such control is particularly desirable when employing an impervious or nearly impervious layer 12 in which case it is easier to over-hydrate the soil between the layer 12 and the surface 14 of the field.

By considerably reducing the quantity of irrigational water my novel subirrigational systems attendantly increase the number of acres of land which can be irrigated with the available water supply. At the same time the crop yield per acre can be considerably increased by elimination of soil erosion and by a controlled supply of water and liquid fertilizer to the crops. In certain areas of the world the optimized use of irrigational water can bring the use of desalinized sea water within the realm of economical conversion. Finally, the population explosion rampant in certain parts of the world and increased demand upon water resources render the optimum usage of irrigational water mandatory.

From the foregoing it will be apparent that novel and efficient forms of subirrigational systems have been disclosed herein. While I have shown and described certain presently preferred embodiments of the invention and have illustrated presently preferred methods of practicing the same, it is to be distinctly understood that the invention is not limited thereto but may be otherwise variously embodied and practiced without departing from the scope of the invention.

I claim:

1. A subirrigational system for agricultural crops and the like, said system comprising a water barrier disposed at a substantially uniform depth below the surface of a field in which the crops are grown, said water barrier being capable of establishing an artificial water table in the soil above the barrier but beneath the root zone of said crops, and means spaced above said barrier for introducing subirrigational water at a location between said root zone and said artificial water table.

2. The combination according to claim 1 wherein said water barrier is an impervious continuous layer of a substantially water-proof material.

3. The combination according to claim 1 wherein said impervious layer is provided with a plurality of flow apertures therein to provide a controlled drainage for said field by downward percolation of irrigational water through said apertures.

4. The combination according to claim 1 wherein said water barrier is semi-pervious to provide flow means for a limited downward percolation of said water.

5. The combination according to claim 1 wherein said subirrigational means include a plurality of widely spaced subirrigational ditches the bottom portions of which are disposed between said root zone and said artificial water table.

6. The combination according to claim 1 wherein said barrier includes a plurality of elongated but relatively wide strips of impervious water barrier material, said strips being spaced laterally of one another to form widely spaced drainage gaps therebetween to permit a limited downward percolation of said irrigational water, said subirrigational means include a plurality of widely spaced subirrigational ditches alternating with said drainage gaps and disposed substantially intermediately of said strips, said ditches extending longitudinally thereof.

7. The combination according to claim 1 wherein said subirrigational means include a plurality of laterally spaced conduits provided with lateral flow means and disposed between said root zone and said artificial water table.

8. The combination according to claim 1 wherein said barrier includes a plurality of elongated but relatively wide strips of impervious water barrier material, said strips being spaced laterally of one another to form widely spaced drainage gaps therebetween to permit a limited downward percolation of said irrigational water, said subirrigational means include a plurality of laterally spaced conduits disposed between said root zone and said artificial water table, said conduits being disposed in an alternating array with said drainage gaps and intermediately of said strips respectively, said conduits extending longitudinally of said strips.

9. The combination according to claim 3 wherein said drainage apertures are arranged in a plurality of laterally spaced rows across said water barrier, and said subirrigational means are arranged in an alternating array therewith to promote lateral and downward dispersion of subirrigational water from said subirrigational means to said rows of drainage apertures.

10. A subirrigational system for agricultural crops and the like, said system comprising a semi-pervious water barrier installed in a field for said crops, said barrier being substantially co-extensive with said field and being disposed at a substantially uniform depth below the surface thereof, said water barrier in addition having laterally spaced drainage means for permitting a downward percolation of irrigational water therethrough, a plurality of laterally spaced subirrigational means for introducing subirrigational water at a depth in said field between the root zone of said crops and an artificial water table provided by said water barrier, said subirrigation means spacedly alternating with said drainage means respectively so that subirrigational water is caused to flow laterally outwardly and then downwardly from said subirrigational means to adjacent ones of said drainage means.

11. In a method for installing a subirrigational system, the steps comprising excavating a strip of an agricultural field, covering the bottom of said excavation with a water barrier strip, excavating an adjacent field strip and uniformly depositing a portion of the removed dirt from said adjacent strip upon said barrier strip to about the height of an anticipated artificial water table to be maintained by said barrier but below the anticipated root zone, laying a subirrigational conduit along the length of said first mentioned field strip and upon said uniform dirt portion, uniformly depositing the remainder of said removed dirt into said first mentioned field strip and repeating the steps of excavating, barrier covering, depositing, conduit laying, and depositing until the entire field is provided with a substantially continuous subsurface water barrier and a subirrigational system spaced above said barrier but beneath said root zone.

12. In a method for installing a subirrigational system, the steps comprising excavating a strip of an agricultural field, covering the bottom of said excavation with a water barrier strip, excavating an adjacent field strip and uniformly depositing the removed dirt from said adjacent field strip upon said barrier strip with the exception of an open subirrigational ditch extending the length of one lateral side of said first mentioned field strip, filling in the bottom of said ditch to a uniform height about equal to the height of an anticipated artificial water table to be maintained by said barrier but below the anticipated root zone, and repeating the steps of excavating, barrier covering, depositing and ditching until the entire field is provided with a substantially continuous subsurface water barrier and a subirrigational ditch system spaced above said barrier but beneath said root zone.

References Cited

UNITED STATES PATENTS 2,067,356 1/1937 Swinhoe _____ 61—13
3,309,875 3/1967 Niederwemmer _____ 61—13

FOREIGN PATENTS 1,180,407 6/1959 France.

JACOB SHAPIRO, Primary Examiner

U.S. Cl. X.R.

47—1, 9; 61—72.1